United States Patent
Butt et al.

(10) Patent No.: US 7,031,104 B1
(45) Date of Patent: Apr. 18, 2006

(54) DISK DRIVE HAVING GUIDE-VANES

(75) Inventors: Arafat M. Butt, Lake Forest, CA (US); Raffi Codilian, Irvine, CA (US); Kin-Cheok Pong, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 355 days.

(21) Appl. No.: 10/137,481

(22) Filed: Apr. 30, 2002

(51) Int. Cl.
*G11B 33/14* (2006.01)
*G11B 5/54* (2006.01)

(52) U.S. Cl. .................................... 360/97.02; 720/649

(58) Field of Classification Search ............. 360/97.02, 360/97.03; 369/247, 263, 247.1, 263.1; 720/648–649, 720/651–652
See application file for complete search history.

(56) References Cited

U.S. PATENT DOCUMENTS

| | | | | |
|---|---|---|---|---|
| 4,101,945 A | * | 7/1978 | Butsch .................... | 360/99.04 |
| 4,280,155 A | * | 7/1981 | Scott et al. .............. | 360/97.03 |
| 4,282,554 A | * | 8/1981 | Ho et al. ................. | 360/97.02 |
| 4,363,057 A | * | 12/1982 | Siverling et al. ........ | 360/97.03 |
| 4,385,333 A | * | 5/1983 | Hasler .................... | 360/97.03 |
| 5,278,713 A | * | 1/1994 | Zucker .................... | 360/128 |
| 5,307,222 A | * | 4/1994 | Dion ....................... | 360/97.02 |
| 5,453,890 A | * | 9/1995 | Takegami et al. ....... | 360/97.02 |
| 5,541,791 A | * | 7/1996 | Yamasaki et al. ....... | 360/256.1 |
| 5,696,649 A | * | 12/1997 | Boutaghou .............. | 360/97.03 |
| 5,754,365 A | * | 5/1998 | Beck et al. .............. | 360/97.02 |
| 5,898,537 A | * | 4/1999 | Oizumi et al. .......... | 360/97.01 |
| 5,898,545 A | | 4/1999 | Schirle | |
| 5,909,339 A | * | 6/1999 | Hong ...................... | 360/98.07 |
| 5,956,203 A | | 9/1999 | Schirle et al. | |
| 6,097,568 A | | 8/2000 | Ekhoff | |
| 6,125,007 A | * | 9/2000 | Beck et al. .............. | 360/265.3 |
| 6,147,834 A | * | 11/2000 | Srikrishna et al. ....... | 360/97.02 |
| 6,208,484 B1 | | 3/2001 | Voights | |
| 6,236,532 B1 | * | 5/2001 | Yanagisawa ............. | 360/97.02 |
| 6,271,987 B1 | * | 8/2001 | Allsup et al. ............ | 360/97.03 |
| 6,407,879 B1 | * | 6/2002 | Fruge et al. ............. | 360/97.02 |
| 6,466,398 B1 | * | 10/2002 | Butler et al. ............. | 360/97.02 |
| 6,542,328 B1 | | 4/2003 | Harrison et al. | |
| 6,549,365 B1 | * | 4/2003 | Severson ................. | 360/97.02 |
| 6,600,626 B1 | | 6/2003 | Shimizu et al. | |
| 6,600,625 B1 | * | 7/2003 | Munninghoff et al. ... | 360/97.02 |
| 6,643,251 B1 | * | 11/2003 | Ikuta et al. ................ | 369/263 |
| 6,728,062 B1 | * | 4/2004 | Ou-Yang et al. ......... | 360/97.02 |
| 2003/0151848 A1 | * | 8/2003 | Lee ......................... | 360/97.02 |

FOREIGN PATENT DOCUMENTS

JP          61269285 A   *  11/1986
JP          02050379 A   *   2/1990

* cited by examiner

*Primary Examiner*—Brian E. Miller
(74) *Attorney, Agent, or Firm*—Knobbe Martens Olson & Bear; Joshua C. Harrison, Esq.

(57) ABSTRACT

A disk drive includes an enclosure, a rotatable disk and an actuator arm, and also includes a plurality of arcuate channels. Airflow is created within the enclosure when the disk rotates. The plurality of arcuate channels facing the disk to decrease the turbulence of the airflow with respect to the actuator arm. The arcuate channels are formed on at least one portion of the enclosure.

10 Claims, 11 Drawing Sheets

DISK DRIVE HAVING GUIDE-VANES

BACKGROUND OF THE INVENTION

1. Field of the Invention

This application relates to a disk drive and more particularly relates to the construction of the components that enclose the disks within the disk drive.

2. Description of the Related Art

One type of data storage device used in a computer to permanently store data is a disk drive. A disk drive includes at least one disk with a magnetic medium that is mounted on and rotated by a spindle motor. The disk drive also includes a data transfer head that writes data onto the magnetic medium and that reads data from the medium in concentric, generally circular tracks. In most applications, the data transfer head is extended out over the magnetic medium by an actuator assembly that moves the head in an arcuate path with respect to the medium. The tracks on the disk are divided into sectors, which are presented to the data transfer head by the rotation of the disk. An enclosure surrounds these components of the disk drive.

The servo-system includes servo data written onto the tracks that can be read by the data transfer head to give an indication of how close the head is to the centerline of a track. When the head is over the centerline of the track and follows it, the head is said to be track-following. When the head wanders from the centerline of the track, there is said to be track misregistration, or "TMR."

Several factors influence the TMR that the disk drive will experience. For example, rotation of the disk causes airflow in the disk drive enclosure. This airflow impinges upon the disk drive components and causes vibrations in those components. For example, under certain circumstances, airflow within the enclosure causes the disks to vibrate. These vibrations cause relative motion between the tracks on the disks and the head, which increases TMR. Increased TMR is not desirable because increased TMR limits track-to-track spacing (i.e., track pitch) and consequently limits areal density.

SUMMARY OF THE INVENTION

It is an object of this invention to decrease turbulent flow of air in the space between a surface of a rotating disk and a surface of a portion of an enclosure that is stationary with respect to the disk.

In one embodiment, the present invention comprises a disk drive that includes an enclosure, a disk, an actuator arm, and a plurality of arcuate channels. The enclosure includes a base and a cover. The disk is rotatable about an axis within the enclosure. The rotating disk creates airflow within the enclosure. The disk has a magnetic medium formed on at least one surface thereof. The actuator arm positions a data transfer head proximate the surface of the disk. The plurality of arcuate channels are located on the enclosure facing the at least one surface of the disk to decrease the turbulence of the airflow with respect to the actuator arm.

In another embodiment, the present invention is a disk drive that has an enclosure, a disk that rotates about an axis within the enclosure, and an actuator arm. The enclosure includes a base and a cover. The disk has a magnetic medium formed on at least one surface thereof. The rotating disk creates airflow within the enclosure. The actuator arm positions a data transfer head proximate the surface of the disk. The disk drive also includes means for reducing the turbulence of the airflow to decrease the TMR of the disk drive. The means is located on the enclosure facing the at least one surface of the disk.

In another embodiment, the present invention comprises a disk drive that includes an enclosure, a disk and an actuator arm. The enclosure includes a base and a cover. The disk is rotatable about an axis within the enclosure. The rotating disk creating airflow within the enclosure. The disk has a magnetic medium formed on at least one surface thereof. The actuator arm positions a data transfer head proximate the surface of the disk. The data transfer head traces out a path over the at least one surface of the disk. The disk drive also has a plurality of channels located on the enclosure facing the at least one surface of the disk. Each of the channels has a longitudinal axis that is perpendicular to the path traced out by the data transfer head.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

DETAILED DESCRIPTION OF THE PREFERRED EMBODIMENT

Figure 1:
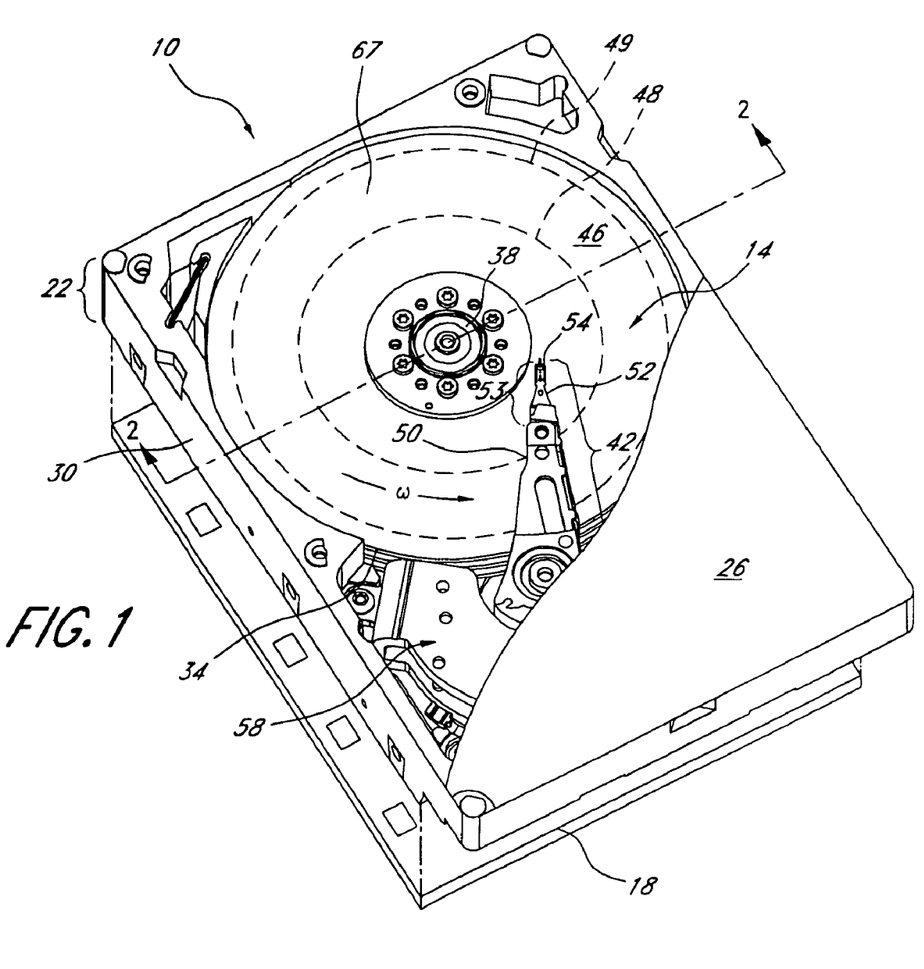
FIG. 1 is a perspective view of one embodiment of a disk drive with a printed circuit board removed and a cover partially broken away to illustrate internal components.

FIG. 1 is a perspective view of a disk drive 10. The disk drive 10 includes a head-disk assembly (HDA) 14 and a printed circuit board 18. The HDA 14 comprises an enclosure 22 that includes a cover 26 and a base 30. The cover 26 has an inner surface 27 that faces the internal components of the disk drive 10 when the disk drive 10 is assembled. The base 30 has an inner surface 31 that faces the internal components of the disk drive 10 when the disk drive 10 is assembled. The printed circuit board 18 is connectable to the base 30, but is shown removed therefrom in FIG. 1 for illustration. The HDA 14 also includes at least one disk 34, a spindle motor assembly 38, and a head-stack assembly (HSA) 42. In the illustrated embodiment, the disk drive 10 includes three disks 34. The disks 34 are rotatable within the enclosure 22 about an axis 36. Each disk 34 is mounted on the spindle motor assembly 38. One skilled in the art will recognize that the disk drive claimed herein includes more or fewer disks 34 in other embodiments.

Each disk 34 has at least one surface 46 that has a magnetic medium deposited thereon. Magnetic transitions representing data are written onto and read from the magnetic medium in a known manner. Each of the disks 34 has a middle circumference 48 and an outer circumference 49. The outer circumference 49 is located proximate the outer edge of the disk 34. The middle circumference 48 is located between the outer circumference 49 and the inner edge of the disk 34. The middle circumference 48 need not be one-half the distance between the outer circumference 49 and the inner edge of the disk 34. The magnetic medium extends at least between the middle circumference 48 and the outer circumference 49.

The HSA 42 includes an actuator arm 50 that positions a data transfer head 54 proximate each of the surfaces 46 that are included in the disk drive 10. One skilled in the art will recognize that a head-gimbal assembly 53 is provided that comprises the data transfer head 54 and a suspension assembly 52. One end of the suspension assembly 52 of the head-gimbal assembly 53 is mounted on the actuator arm 50. The data transfer head 54 includes, in one embodiment, a read element and a write element and thus operates in a read/write system. One skilled in the art will recognize that the invention claimed below could also be used to reduce TMR in a read-only application, i.e., in an application having a data transfer head with a read element only.

The actuator arm 50 is positioned by a rotary actuator 58 that is positioned under the control of a conventional servo system.

The spindle motor assembly 38 includes a rotatable hub 51 to which the disks 34 are mounted. The spindle motor assembly 38 is electrically connected to circuitry located on the printed circuit board 18, e.g., to a spindle motor controller. The spindle motor controller controls the rotation of the hub 51 of the spindle motor assembly 38 and the disks 34 attached thereto. When the disk drive 10 is operating, the disks 34 are rotated at a substantially constant angular velocity (o. The direction of the rotation of the disks 34 is indicated in FIG. 1. Of course, one skilled in the art will recognize that the invention described herein can be carried out in a disk drive having rotation opposite of that shown in FIG. 1.

Figure 2:
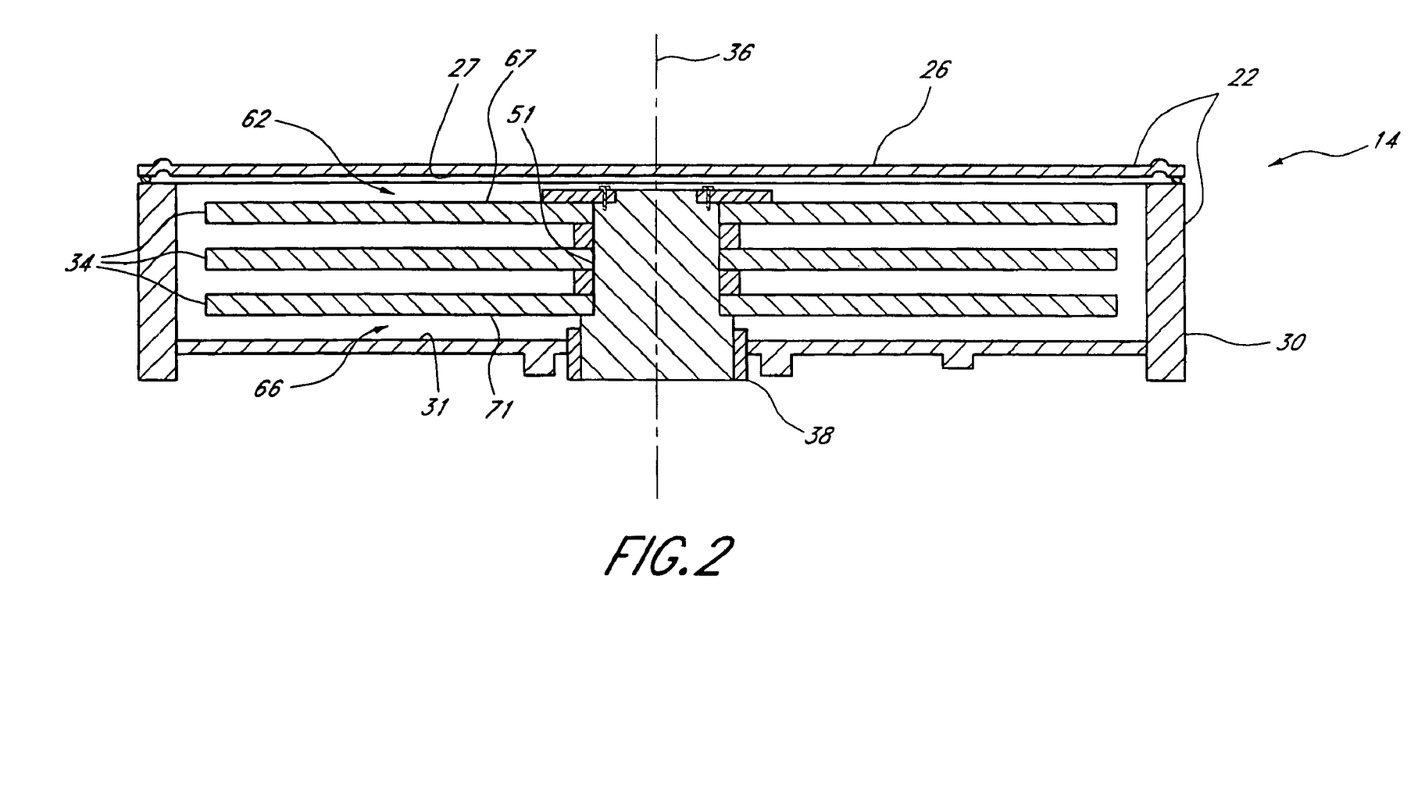
FIG. 2 cross-section view of a head-disk assembly of the disk drive of FIG. 1 taken along a section line 2—2.

The rotation of the disks 34 creates airflow within the enclosure 22. In particular, airflow is created in a first enclosure space 62 and in a second enclosure space 66. FIG. 2 illustrates that the first enclosure space 62 is defined by the inner surface 27 of the cover 26 and an upper surface 67 of the uppermost disk 34 that is mounted on the spindle motor assembly 38 farthest from the printed circuit board 18 (see FIG. 1). FIG. 2 also illustrates that the second enclosure space 66 is defined by the portion of the inner surface 31 of the base 30 and a lower surface 71 of the lowermost disk 34. As used herein, "upper" is defined as the side of the disk drive 10 to which the cover 26 is attached and "lower" is defined as the side of the disk drive 10 to which the printed circuit board 18 is attached, as shown in FIG. 1. The airflow generally follows the rotation of the disks 34, but can be quite turbulent in the first enclosure space 62 and in the second enclosure space 66. This turbulence greatly increases the vibration of the disks 34 under some conditions, which increases TMR of the disk drive 10. As discussed above, this is undesirable because higher TMR limits the track pitch, and consequently limits the areal density. FIGS. 3–7 show various embodiments of components of the enclosure 22 that have channels to reduce the turbulence within the enclosure, e.g., in at least one of the first enclosure space 62 and the second enclosure space 66.

Figure 3:
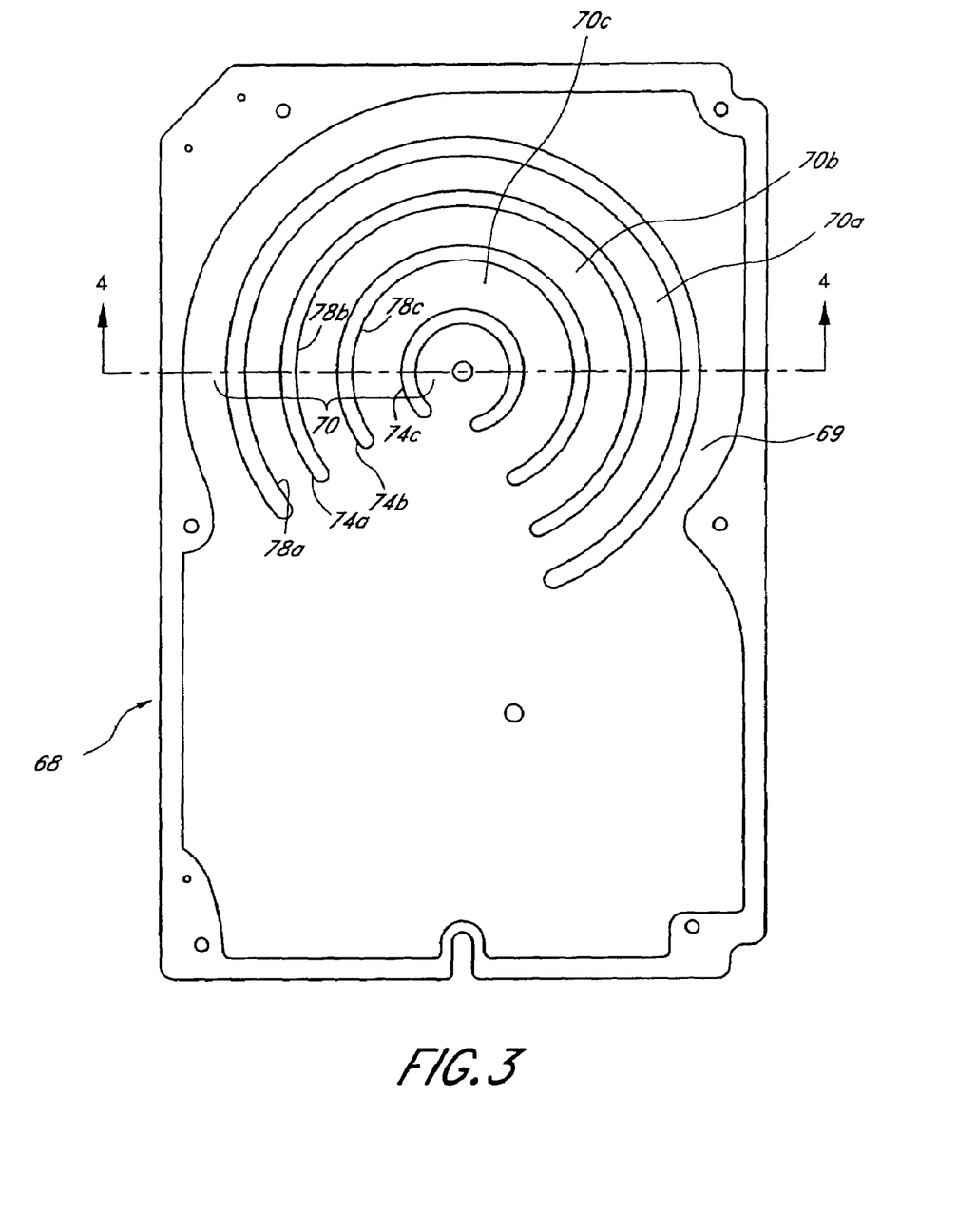
FIG. 3 is a bottom plan view of one embodiment of a cover of a disk drive.

FIG. 3 is a bottom plan view of one embodiment of a cover 68 that is mountable to the base 30 of the enclosure 22 of the disk drive 10. The cover 68 has an inner surface 69, which is the surface of the cover 68 that faces the inside of the disk drive 10 when the cover 68 is affixed to the base 30. As discussed above, the inner surface 69 of the cover 68 and the upper surface 67 of the uppermost disk 34 define the first enclosure space 62. Generally, the cover 68 includes a plurality of arcuate channels 70. In particular, in one embodiment, the cover 68 includes an arcuate channel 70a, an arcuate channel 70b, and an arcuate channel 70c disposed generally parallel to an outer circumference of the disks 34. In one embodiment, the arcuate channels 70a–70c are centered on the axis 36, and subtend a central angle between about 210 degrees and about 270 degrees. In another embodiment, the arcuate channels 70a–70c are centered on the axis 36, and subtend a central angle of about 240 degrees. Other embodiments of the cover 68 include more or fewer arcuate channels.

The arcuate channels 70a, 70b, and 70c are configured to cause the air to flow more uniformly to thereby make the airflow in the first enclosure space 62 less turbulent. Thus, the channels 70a, 70b, and 70c tend to reduce disk vibration that is induced by turbulent airflow within the first enclosure space 62. By reducing turbulence in the first enclosure space 62, the arcuate channels 70a, 70b, and 70c reduce vibrations in one or more of the disks 34, the HSA 42, the actuator arm 50, and the suspension assembly 52. Such reduced vibration reduces the TMR of the disk drive 10. By reducing the TMR of the disk drive 10, the arcuate channels 70a, 70b, and 70c provides for improved track pitch and areal density.

The arcuate channels 70a, 70b, and 70c are formed on the cover 68 in various embodiments by a stamping process, by a casting process, or by any other suitable process known to those skilled in the art. In some embodiments, the plurality of arcuate channels 70 are formed on the cover 68, e.g., by affixing the aforementioned walls to the cover 68 with an adhesive, with at least one mechanical fastener, with a welding process, or with any other suitable process or fastener.

Figure 4:
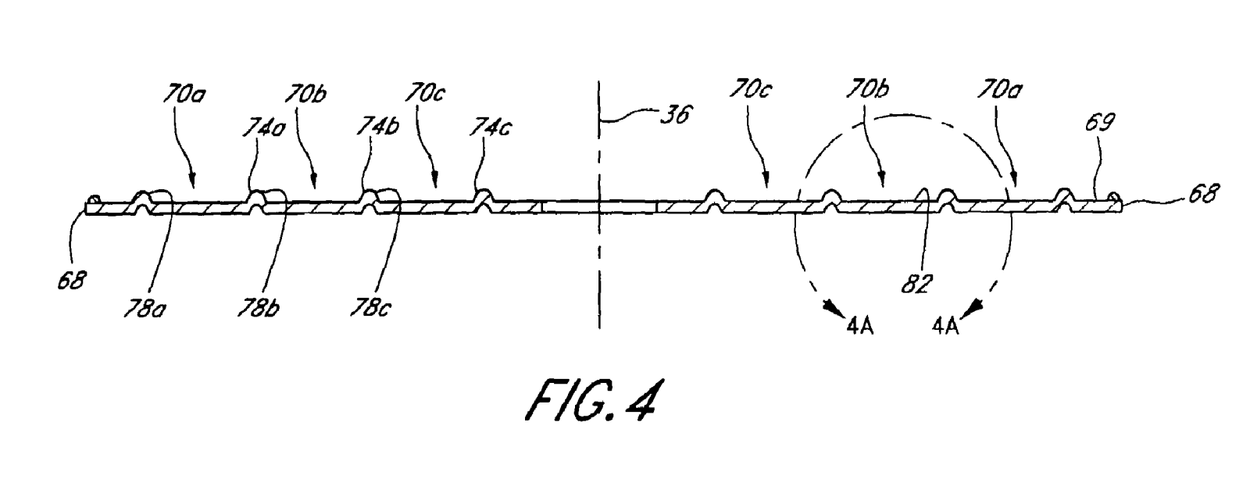
FIG. 4 is a cross-sectional view of the disk drive cover of FIG. 3 taken along a section line 4—4.

FIG. 4 shows the cover 68 of FIG. 3 in cross section. In one embodiment, each of the arcuate channels 70a, 70b, and 70c is formed between a first adjacent wall and a second adjacent wall. In particular, the arcuate channel 70a is formed between a first adjacent wall 74a and a second adjacent wall 78a. The arcuate channel 70b is formed between a first adjacent wall 74b and a second adjacent wall 78b. The arcuate channel 70c is formed between a first adjacent wall 74c and a second adjacent wall 78c. In the illustrated embodiment, the first adjacent walls 74a, 74b, 74c are located between the axis of rotation 36 and the respective second adjacent walls 78a, 78b, 78c. In one embodiment, each of the first adjacent walls 74a, 74b, and 74c and each of the second adjacent walls 78a, 78b, and 78c extend from the inner surface 69 of the cover 68, i.e., as a series of protrusions. In one embodiment, at least two of the plurality of arcuate channels 70 are adjacent one another, e.g. 70a and 70b in FIG. 4, such that the first adjacent wall 74a of the arcuate channel 70a and the second adjacent wall 78b of the arcuate channel 70b are formed on the same protrusion. In another embodiment, the channels 70a, 70b, and 70c are formed as a plurality of arcuate recesses in the cover 68.

Figure 4A:
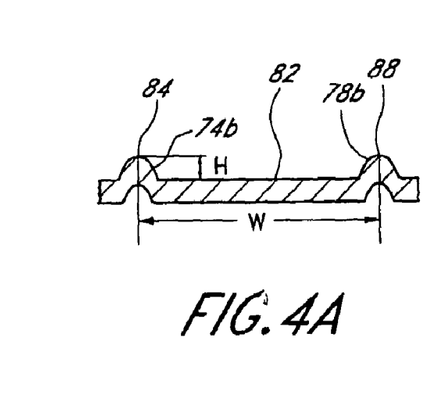
FIG. 4A is an enlarged sectional view of a portion of the cover of FIGS. 3 and 4 taken along the section line 4A—4A.
Figure 4B:
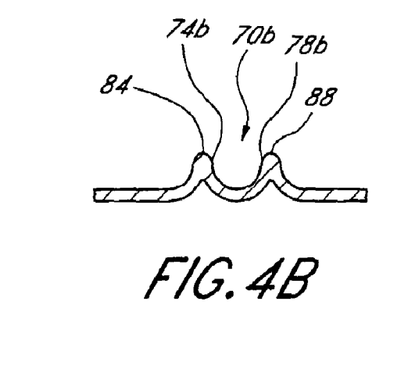
FIG. 4B is an enlarged sectional view of a portion of another embodiment of a cover having a transverse cross-section that includes a semi-circular portion.
Figure 4C:
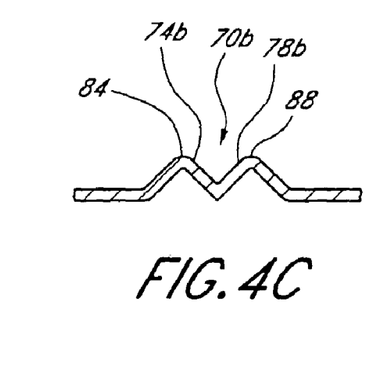
FIG. 4C is an enlarged sectional view of a portion of another embodiment of a cover having a transverse cross-section that includes a substantially "V-shaped" profile.

FIG. 4A shows an enlarged view of a portion of FIG. 4 (e.g., the channel 70b). Each of the arcuate channels 70a, 70b, and 70c comprises a channel base 82. Each of the channels 70a, 70b, 70c is defined between the respective first adjacent wall 74a, 74b, 74c and the respective second adjacent wall 78a, 78b, 78c. Each of the first adjacent walls 74a, 74b, 74c has a first wall crest 84. Each of the second adjacent walls 78a, 78b, 78c has a second wall crest 88. In one embodiment, the transverse cross-section of at least one of the plurality of arcuate channels 70 includes a base 82 with a flat portion between the first adjacent wall 74b and the second adjacent wall 78b.

In one embodiment, a transverse cross-section of at least one of the plurality of arcuate channels 70 includes a curved portion. In another embodiment (FIG. 4B), the transverse cross-section of at least one of the plurality of arcuate channels 70 includes a semi-circular portion. In another embodiment (FIG. 4C), the transverse cross-section of at least one of the plurality of arcuate channels 70 (e.g., the channel 70b) has a substantially "V-shaped" profile, i.e., the first adjacent wall 74b and the second adjacent wall 78b of the channels 70b have an inclined linear side profile and the base 82 includes little to no flat portion.

In some embodiments, the dimensions of the channels 70 are important. It is presently contemplated that such dimensions will be determined experimentally. A starting point for such experimental determination is given by fluid dynamic principles. For example, the Reynolds number generally predicts whether fluid flow is generally laminar or generally turbulent for particular surrounding structure. Laminar flow, which corresponds to relatively small Reynolds numbers, tends to have a substantially uniform fluid-flow velocity. Turbulent flow, by contrast, which corresponds to relatively large Reynolds numbers, tends to have a substantially non-uniform fluid-flow velocity. The Reynolds number, Re, can be calculated as:

$$Re=[(\text{fluid density})\times(\text{fluid-flow velocity})\times(\text{characteristic length})]\div(\text{fluid viscosity}).$$

For a given flow condition, a theoretical critical Reynolds number is the number at which the fluid-flow condition changes from laminar flow to turbulent flow. In one embodiment, the arcuate channels 70 have a channel width W defined by the perpendicular distance between the first wall crest 84 and the second wall crest 88 and a channel height H defined by the height of the first wall crest 84 and/or the second wall crest 88 with respect to the channel base 82. The channel width W can be used in the above equation as the characteristic length. Reducing characteristic length, e.g., the channel width W, will reduce the Reynolds number, contributing to more laminar airflow. The equation, thus, provides a starting point for the determination of the dimensions of one or more of the channels described herein.

Figure 5A:
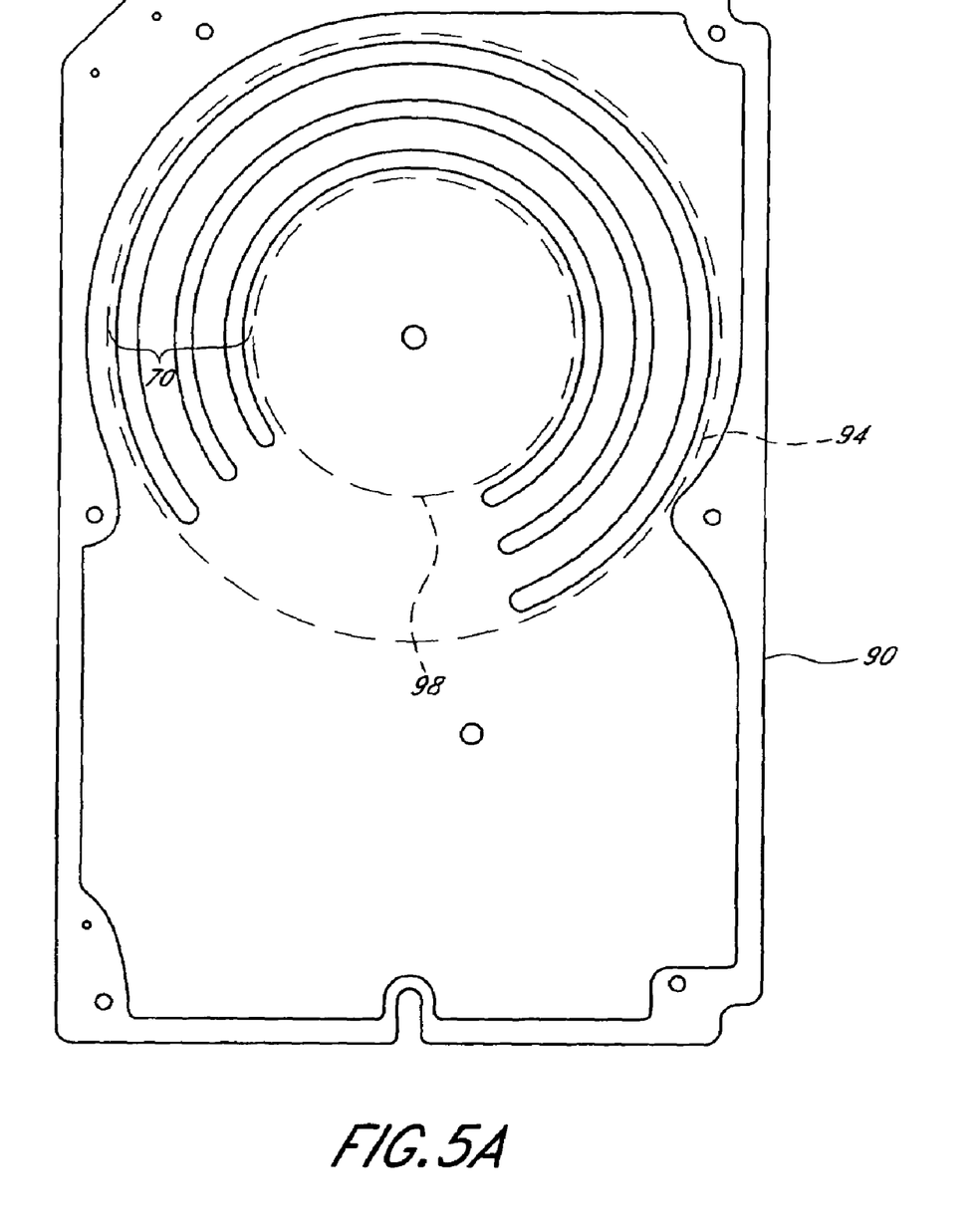
FIG. 5A is a bottom plan view of another embodiment of a cover of a disk drive.

FIG. 5A illustrates another embodiment of a cover 90 that includes an outer portion 94 and a middle portion 98. The outer portion 94 is the portion of the cover 90 that is proximate the outer circumference 49 when the cover 90 is affixed to the base 30. The middle portion 98 is the portion of the cover 90 that is proximate the middle circumference 48 when the cover 90 is affixed to the base 30. The embodiment of FIG. 5A shows the arcuate channels 70 located generally toward an outer portion 94 of the cover 90. More particularly, the arcuate channels 70 are located primarily between the outer portion 94 and the middle portion 98. As used herein, "primarily between" means that at least one-half of the channels are disposed between the outer portion 94 and the middle portion 98. Other embodiments concentrate the positioning of the arcuate channels 70 in various other portions of the cover 90 where turbulent flow and TMR-increasing vibrations are most likely to arise.

Figure 5B:
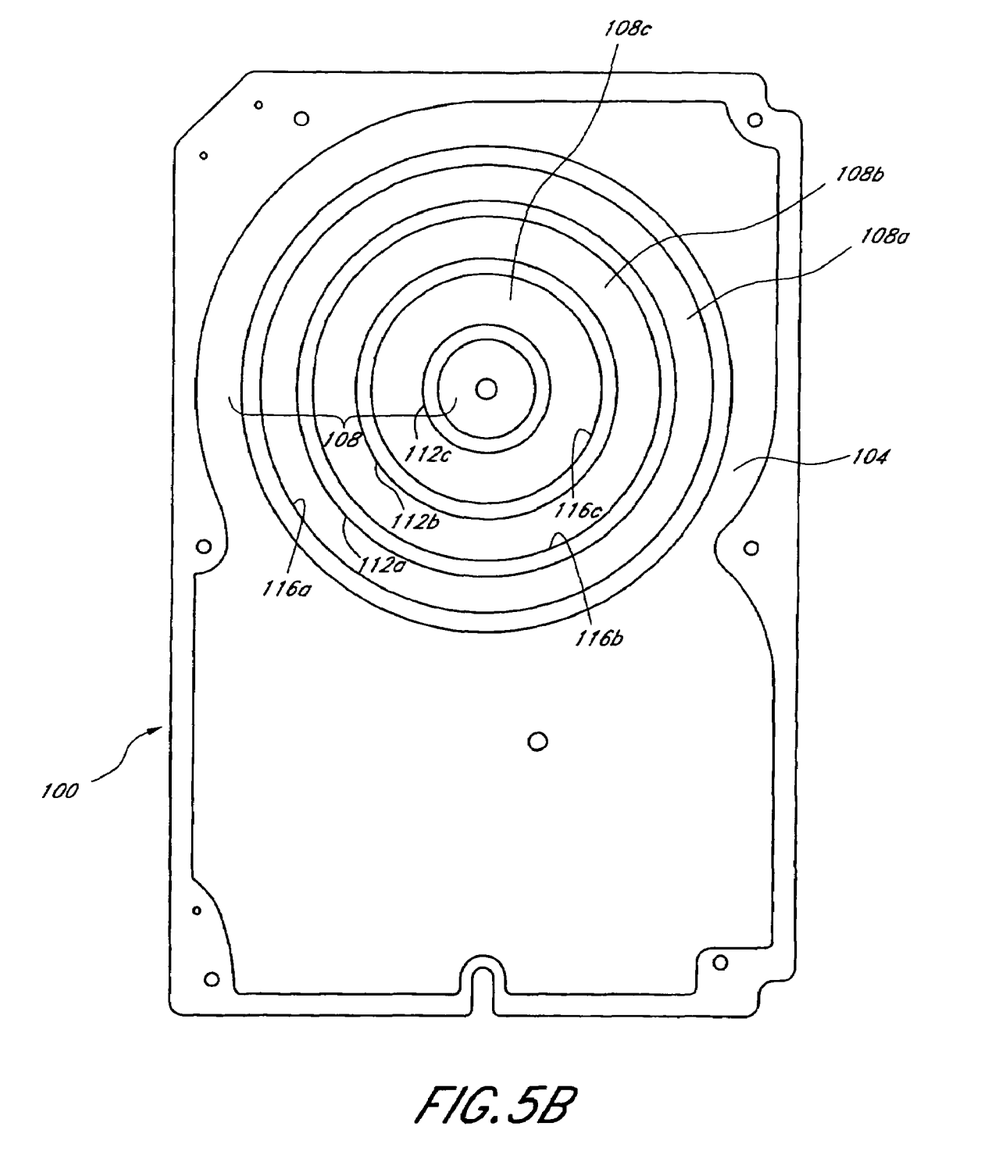
FIG. 5B is a bottom plan view of another embodiment of a cover of a disk drive.

FIG. 5B is a bottom plan view of another embodiment of a cover 100 of a disk drive 10. The cover 100 has an inner surface 104, which is the surface of the cover 100 that faces the inside of the disk drive 10 when the cover 100 is affixed to the base 30. The cover 100 includes a plurality of arcuate channels 108. In one embodiment, the cover 100 includes an arcuate channel 108a, an arcuate channel 108b, and an arcuate channel 108c. In the embodiment of FIG. 5B, each of the arcuate channels 108a, 108b, 108c forms a generally closed path, e.g., subtending a central angle of about 360 degrees. The arcuate channels 108a, 108b, 108c are centered on the axis 36 when the cover 100 is attached to the base 30. In another embodiment, at least one of the arcuate channels 108a, 108b, 108c forms a generally closed path of a different shape, e.g., an oval. Other closed-path shapes are also possible.

As discussed above in connection with the channels 70a, 70b, 70c of FIGS. 3 and 4, the channels 108a, 108b, 108c are defined by walls having a height H with respect to the base of the channels. For example, a first adjacent wall 112a and a second adjacent wall 116a define the channel 108a. Similarly, a first adjacent wall 112b and a second adjacent wall 116b define the channel 108b. Similarly, a first adjacent wall 112c and a second adjacent wall 116c define the channel 108c. In one embodiment, the height H is between about 0.4 millimeters and about 3.7 millimeters. In another embodiment, the height H is between about 1.0 millimeters and about 3.0 millimeters. In another embodiment, the height H is about 2.0 millimeters. In another embodiment, the height H is about 3.5 millimeters. The height H of walls that define the channels 108a, 108b, 108c may be less for the embodiments having closed path channels than for the embodiment having acruate portions that subtend an angle substantially less than the 360 degrees. In another embodiment, the height H of the walls that define the channels 108a, 108b, 108c may be variable, so that the walls can be reduced in height in order to provide clearance for structure within the enclosure 22, e.g., clearance for one or more portions of the HSA 42, such as the actuator arm 50. By making the walls variable in height, the height of the walls 112, 116 can be similar to the height of the walls 74, 78 where clearance is not needed for structures within the enclosure 22.

Figure 5C:
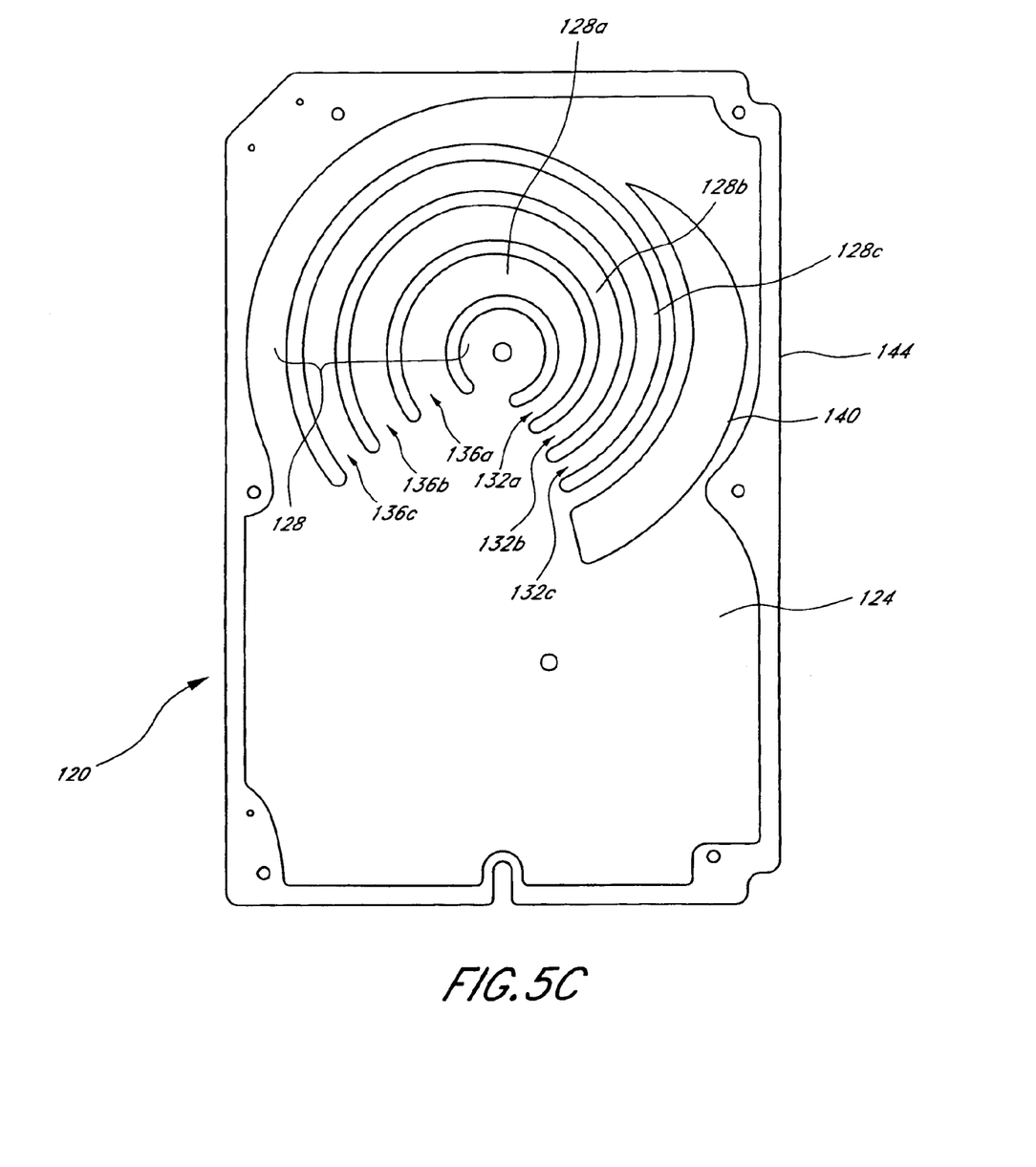
FIG. 5C is a bottom plan view of another embodiment of a cover of a disk drive.

FIG. 5C is a bottom plan view of another embodiment of a cover 120 of a disk drive 10. The cover 120 has an inner surface 124, which is the surface of the cover 120 that faces the inside of the disk drive 10 when the cover 120 is affixed to the base 30. The cover 120 includes a plurality of channels 128. In particular, in the embodiment illustrated in FIG. 5C, the cover 120 includes a channel 128a, a channel 128b, and a channel 128c. The channels 128a, 128b, 128c are formed by walls as in the channels 70a, 70b, 70c. The channel 128a has an upstream end 132a and a downstream end 136a. As used herein, "upstream" is defined relative to the position of the actuator arm 50 and by the direction of the rotation of the disks 34 within the enclosure 22. (Locations proximate to the actuator arm 50, but located in the direction opposite of rotation of the disk (see FIG. 1) are "upstream" of the actuator arm 50, while locations proximate to the actuator arm 50, but located in the direction of rotation of the disk (see FIG. 1) are "downstream" of the actuator arm 50.) Similarly, the channel 128*b* has an upstream end 132*b* and a downstream end 136*b*. The channel 128*c* also has an upstream end 132*c* and a downstream end 136*c*. Preferably, the width of the channels 128*a*, 128*b*, 128*c* vary along their lengths, e.g., the width of the channels 128*a*, 128*b*, 128*c* at their respective upstream ends 132*a*, 132*b*, 132*c* is narrower than the width of the channels 128*a*, 128*b*, 128*c* at their respective downstream ends 136*a*, 136*b*, 136*c*. In another embodiment, the width of the channels 128*a*, 128*b*, 128*c* at their respective downstream ends 132*a*, 132*b*, 132*c* is narrower than the width of the channels 128*a*, 128*b*, 128*c* at their respective upstream ends 132*a*, 132*b*, 132*c*.

In the illustrated embodiment, the cover 120 is also provided with a wedge-shaped portion 140 that protects the actuator arm 50 from airflow generated upstream of the actuator arm 50. The wedge-shaped portion 140 is located between the channel 128*c* and an edge 144 of the cover 120.

Figure 5D:
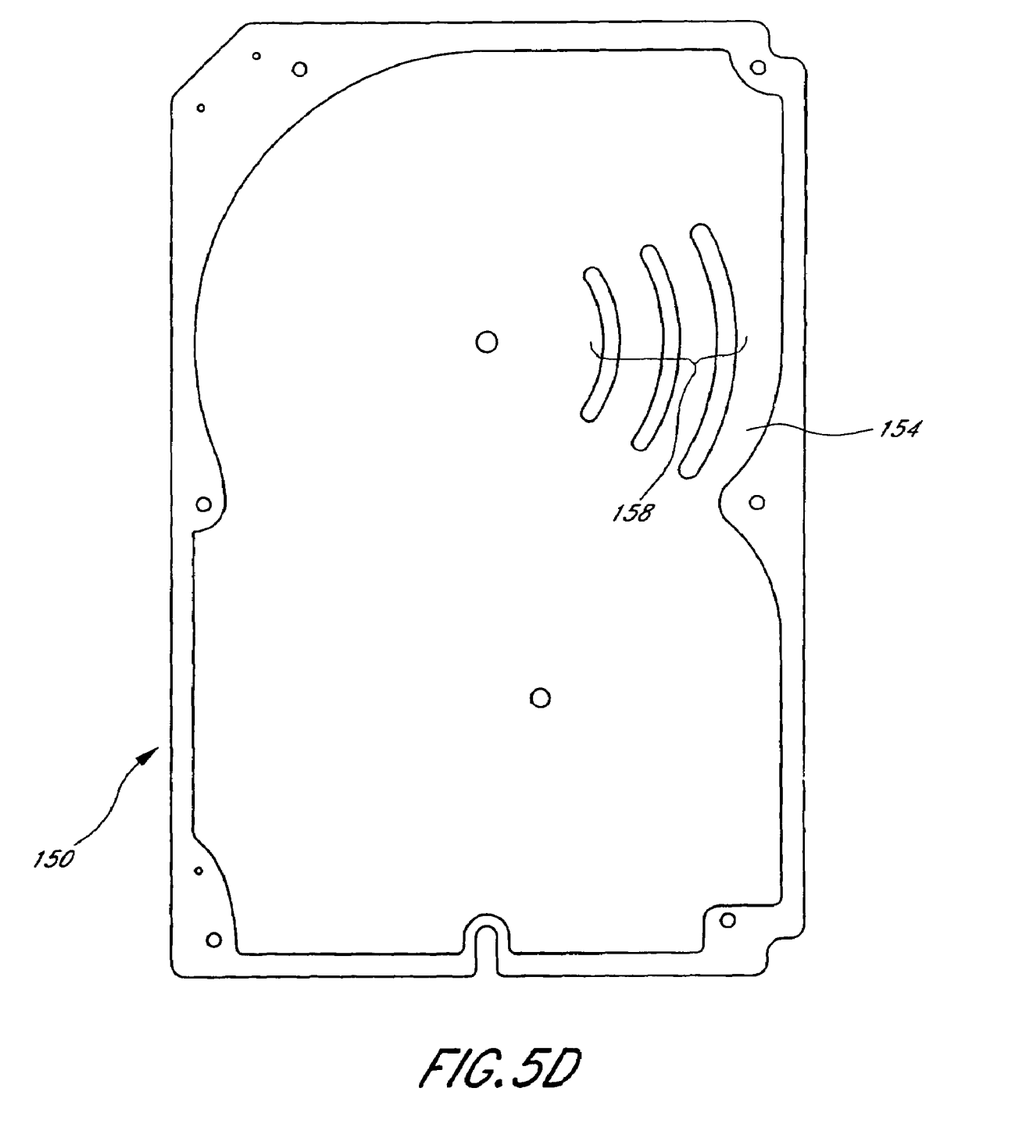
FIG. 5D is a bottom plan view of another embodiment of a cover of a disk drive.

FIG. 5D is a bottom plan view of another embodiment of a cover 150 of a disk drive 10. In this embodiment, the cover 150 has an inner surface 154 that includes a plurality of channels 158. The channels 158 are similar to the plurality of arcuate channels 70, except that they subtend a central angle that is generally much less than the central angle subtended by the plurality of arcuate channels 70. In one embodiment, the plurality of arcuate channels 158 are on the cover 150 so that when the cover 150 is affixed to the base 30, the plurality of arcuate channels 158 are located upstream of the actuator arm 50. In other embodiments, the channels 158 are located downstream of the actuator arm 50. In another embodiment, the channels 158 are located roughly midway between the upstream side of the actuator arm 50 and the downstream side of the actuator arm 50.

Figure 5E:
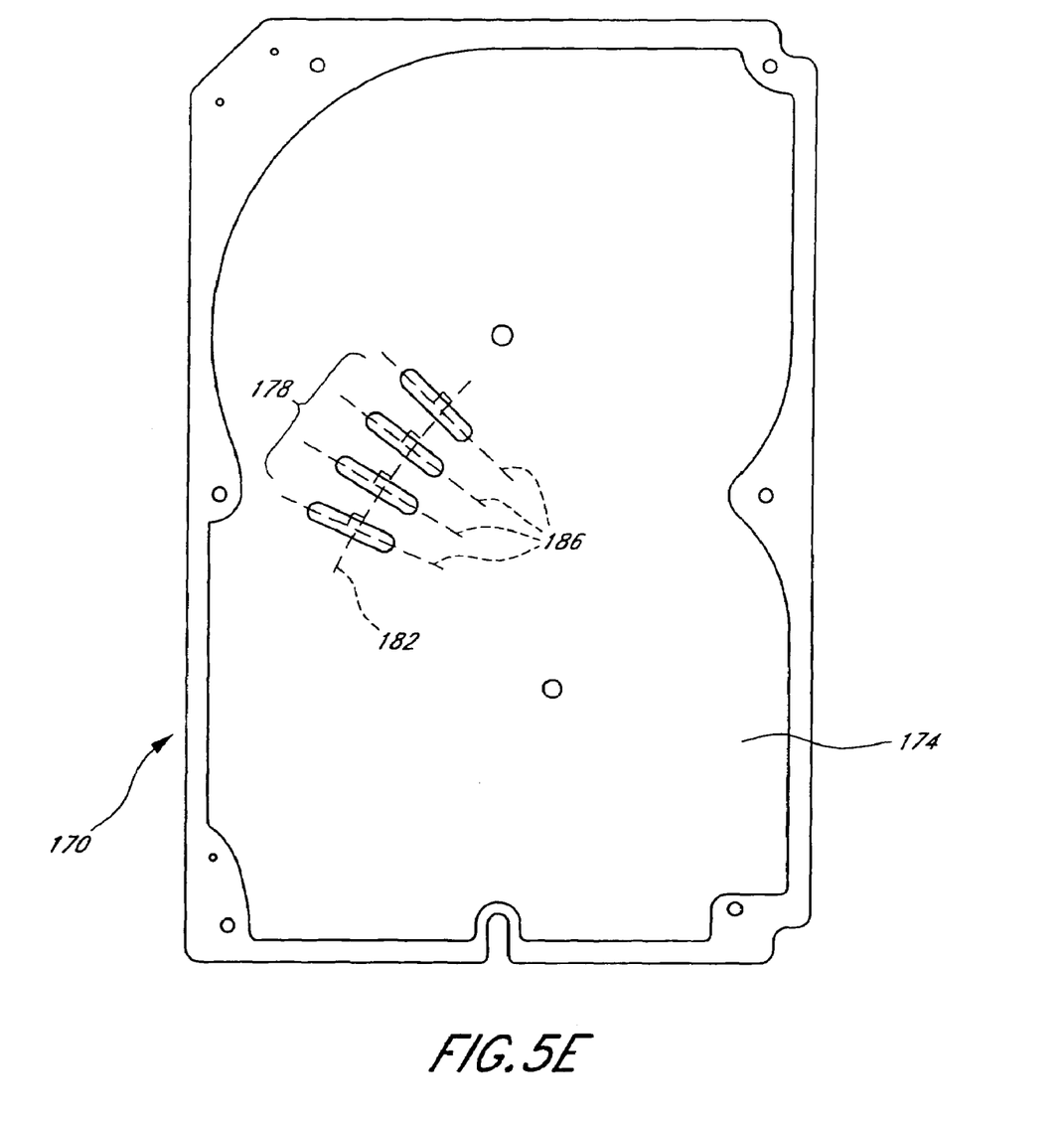
FIG. 5E is a bottom plan view of another embodiment of a cover of a disk drive.

FIG. 5E is a bottom plan view of another embodiment of a cover 170 of a disk drive 10. The cover 170 includes an inner surface 174. The cover 170 includes a plurality of channels 178. As with the channels 70, the channels 178 are formed by walls having a height H with respect to the base of the channels. An imaginary line 182 corresponds to the rotary path that the data transfer head 54 traces out beneath the cover 170 when the cover 170 is affixed to the base 30 and the disk drive 10 is operating. In one embodiment, each of the channels 178 is somewhat elongated, and therefore have a longitudinal axis 186. Each of the channels 178 is located on the cover 170 and is formed such that the longitudinal axis 186 is generally perpendicular to the line 182, which traces out the rotary path of the data transfer head 54. In one embodiment, the channels 178 are located on the cover 170 such that when the cover 170 is affixed to the base 30 and the disk drive 10 is operating, the data transfer head 54 passes between the channels 178 and the disks 34. In another embodiment, the channels 178 are located on the cover 170 such that when the cover 170 is affixed to the base 30 and the disk drive 10 is operating, the data transfer head 54 is generally upstream of the channels 178. In another embodiment, the channels 178 are located on the cover 170 such that when the cover 170 is affixed to the base 30 and the disk drive 10 is operating, the data transfer head 54 is generally downstream of the channels 178.

Figure 6:
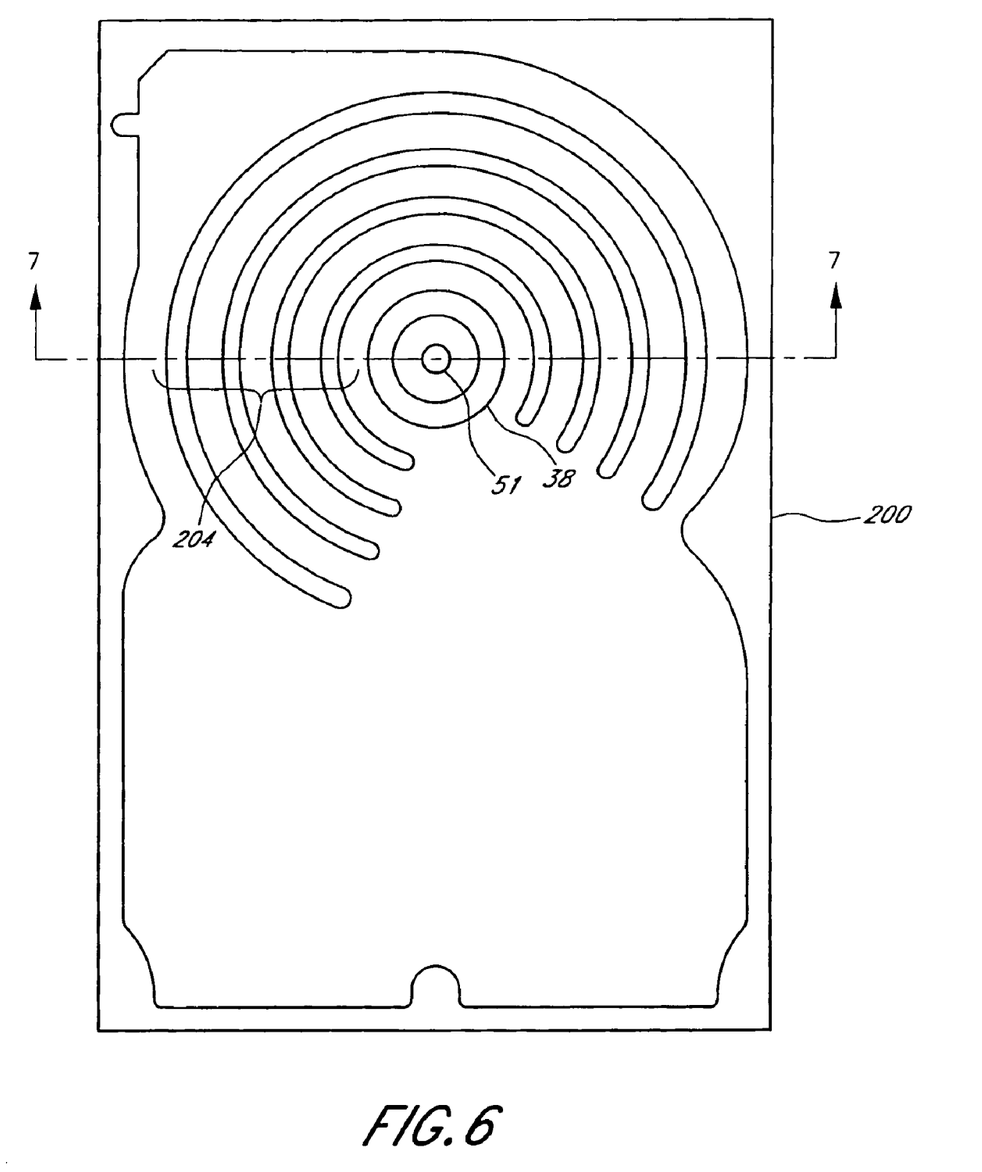
FIG. 6 is a top view of a base of a disk drive.
Figure 7:
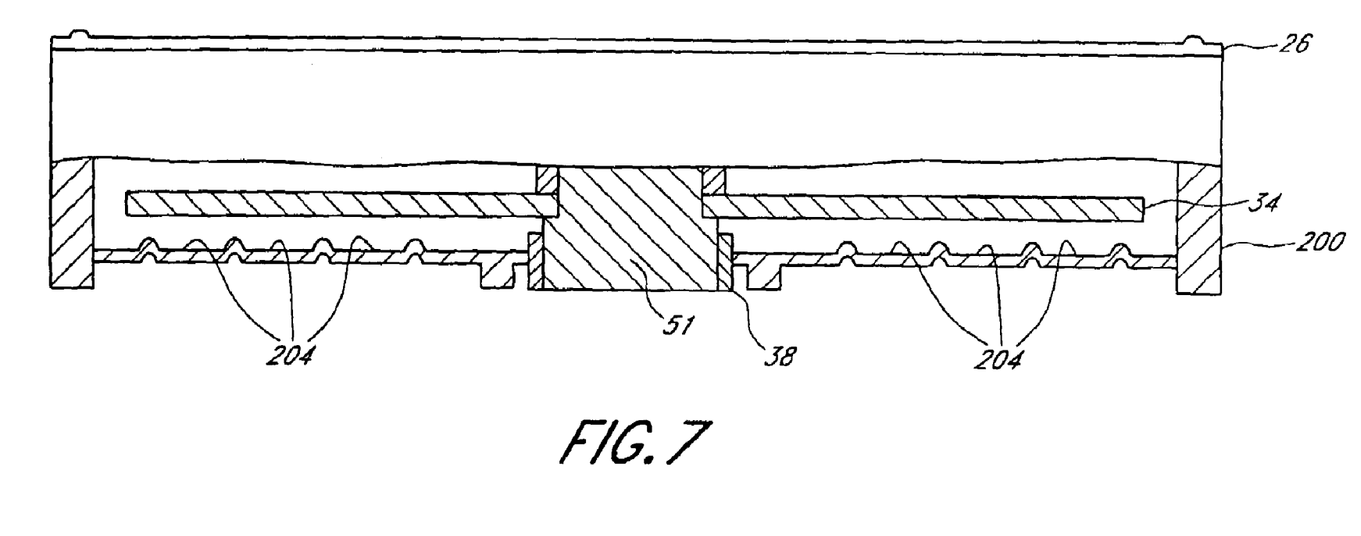
FIG. 7 is an elevation view in partial cross-section of a disk drive including the disk drive base of FIG. 6 with a portion of the base broken away to show the relationship of the spindle motor hub, a disk mounted thereon, and the disk drive base.

FIGS. 6 and 7 illustrate an embodiment of a base 200 of the enclosure 22. The base 200 has a plurality of arcuate channels 204. The arcuate channels 204 are similar to the arcuate channels 70. The base 200 is similar to the cover 68 of FIGS. 3 and 4, except that the pattern of the arcuate channels 204 is the mirror image of the pattern of the channels 70. The channels 204 can be produced by a machining process, a casting process, or by any other suitable process. As with the channels 70, the channels 204 could also be formed on the base 200, e.g., by affixing walls to the base with an adhesive, with a mechanical fastener, or with any other suitable process or fastener. As with the arcuate channels 70, the arcuate channels 204 could form closed path channels (e.g., circular channels similar to those shown on the cover of FIG. 5B), or the channels 204 could subtend a central angle of less than 360 degrees (see FIG. 6). In one embodiment, the arcuate channels 204 subtend a central angle between about 210 degrees and about 270 degrees. In another embodiment, the arcuate channels 204 subtend a central angle of about 240 degrees.

The base 200 can also be configured with a pattern of channels that is the mirror image of the pattern of channels of the other cover configurations. As with the cover 90 (FIG. 5A), a base could be configured with channels 204 concentrated in one or more portions of an inner surface of the base. As with the cover 120 (FIG. 5C), the base 200 could have channels 204 having varying channel widths. As with the cover 150 (FIG. 5D), the base 200 could be formed with channels 204 that subtend a central angle that is much less than the central angle shown in FIG. 6, e.g., between about 15 degrees and about 30 degrees. As with the cover 170 (FIG. 5E), the base 200 could be provided with channels 204 that are formed on the base and oriented so that the longitudinal axis of the channels 204 is generally perpendicular to the path traced out by the rotary motion of the data transfer head 54.

As with the arcuate channels 70, the arcuate channels 204 are configured to make the airflow in the second enclosure space 66 less turbulent. By reducing turbulence in the second enclosure space 66, the arcuate channels 204 reduce vibrations in one or more of the disks 34, the HSA 42, the actuator arm 50, and the suspension assembly 52. Such reduced vibration reduces the TMR of the disk drive 10 and thereby improves the track pitch and areal density of the disk drive 10.

One skilled in the art will appreciate that an enclosure 22 could be provided with the cover 68 having the arcuate channels 70 and with the base 200 having the arcuate channels 204. In this embodiment, the arcuate channels 70 are configured to make the airflow in the first enclosure space 62 less turbulent. The arcuate channels 204 are configured to make the airflow in the second enclosure space 66 less turbulent. Thus, the arcuate channels 70 and the arcuate channels 204 tend to reduce vibrations in one or more of the disks 34, the HSA 42, the actuator arm 50, and the suspension assembly 52. This embodiment reduces the TMR of the disk drive 10 is reduced even more than when only one of the arcuate channels 70 and the arcuate channels 204 are used. This improves track pitch and, consequently, improves areal density.

One skilled in the art should recognize that other combinations are also possible. For example, any of the covers 68, 90, 100, 120, 150, and 170 could also be used with the base 200. Also, any of the covers 68, 90, 100, 120, 150, and 170 could be combined with a base 200 having channels 204 concentrated in one or more portions of the inner surface of the base 180 or with a base having channels 204 that are formed as closed paths. Also, any of the covers 68, 90, 100, 120, 150, and 170 could be combined with a base 200 having channels 204 that have varying widths or with a base 200 having closed path channels 204 that subtend an angle that is much less than the central angle shown in FIG. 6, e.g., between about 15 degrees and about 30 degrees. Also, any of the covers 68, 90, 100, 120, 150, and 170 could be combined with a base 200 having channels 204 that are located on the base such that their longitudinal axes are perpendicular to the path traced out by the rotary motion of the data transfer head 54.

What is claimed is:

1. A disk drive comprising:
   an enclosure having a base and a cover;
   a disk that rotates about an axis within the enclosure, the rotating disk having an axis of rotation and a magnetic medium formed on at least one surface thereof, the rotating disk creating airflow within the enclosure;
   an actuator arm that positions a data transfer head proximate the surface of the disk; and
   a plurality of arcuate channels located on a face of the enclosure that is approximately parallel to the at least one surface of the disk, each of the plurality of arcuate channels being disposed within said airflow and comprising two arcuate adjacent walls and a channel base that is located between the two arcuate adjacent walls, each of the arcuate adjacent walls being oriented concentrically about the axis of rotation of the disk, and each of the arcuate adjacent walls extending closer to the at least one surface of the disk than does the channel base.

2. The disk drive of claim 1, wherein the face of the enclosure is an approximately planar surface.

3. The disk drive of claim 1, wherein the face of the enclosure is an approximately planar surface of the base.

4. The disk drive of claim 1, wherein the face of the enclosure is an approximately planar surface of the cover.

5. The disk drive of claim 1, wherein each of the arcuate adjacent walls extends from the face of the enclosure by a height in the range 0.4 mm to 3.7 mm.

6. The disk drive of claim 1, wherein a transverse cross-section of each of the plurality of arcuate channels comprises a curved portion.

7. The disk drive of claim 1, wherein a transverse cross-section of each of the plurality of arcuate channels comprises a semi-circular portion.

8. The disk drive of claim 1, wherein each of the plurality of arcuate channels subtends a central angle between about 210 degrees and about 270 degrees.

9. The disk drive of claim 1, wherein each of the plurality of arcuate channels subtends a central angle of about 240 degrees.

10. The disk drive of claim 1, wherein each of the plurality of arcuate channels subtends a central angle of about 360 degrees.

* * * * *